(No Model.) 3 Sheets—Sheet 3.
G. P. CLEVELAND.
GANG PLOW.
No. 455,171. Patented June 30, 1891.
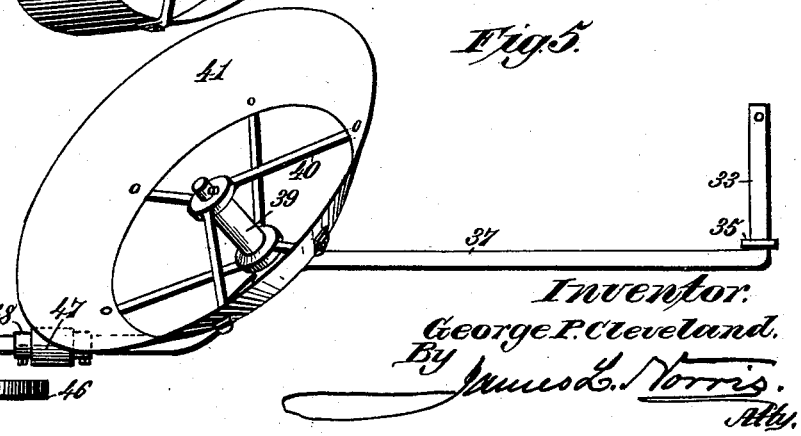
Witnesses
Inventor:
George P. Cleveland
By James L. Norris
Atty.

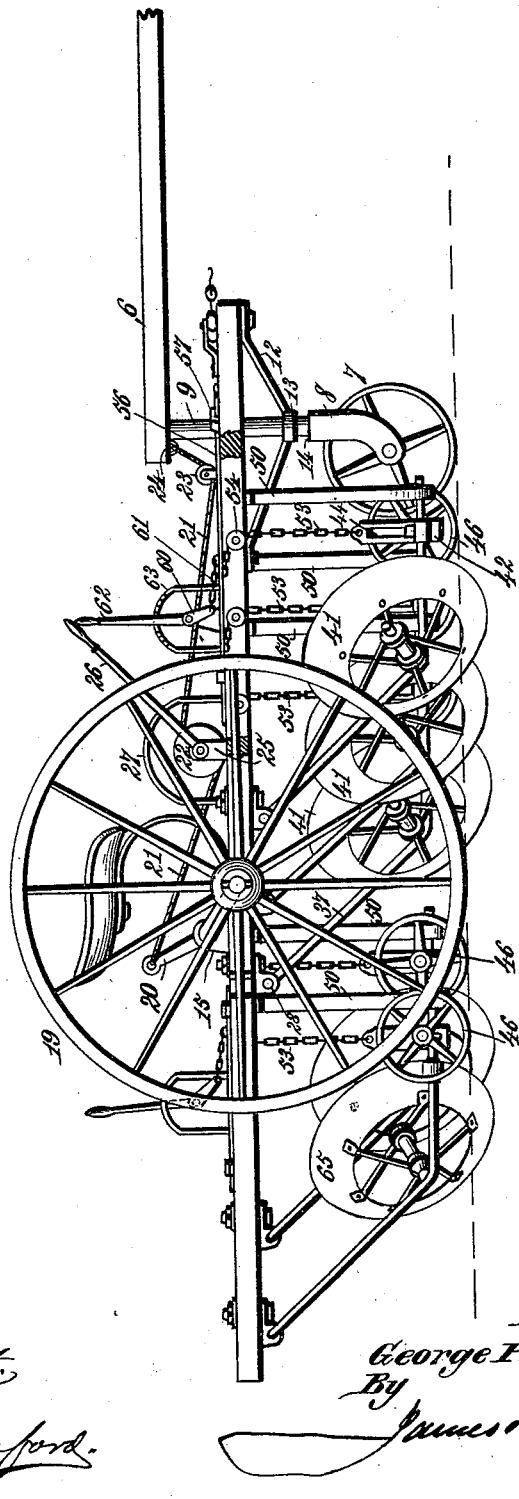

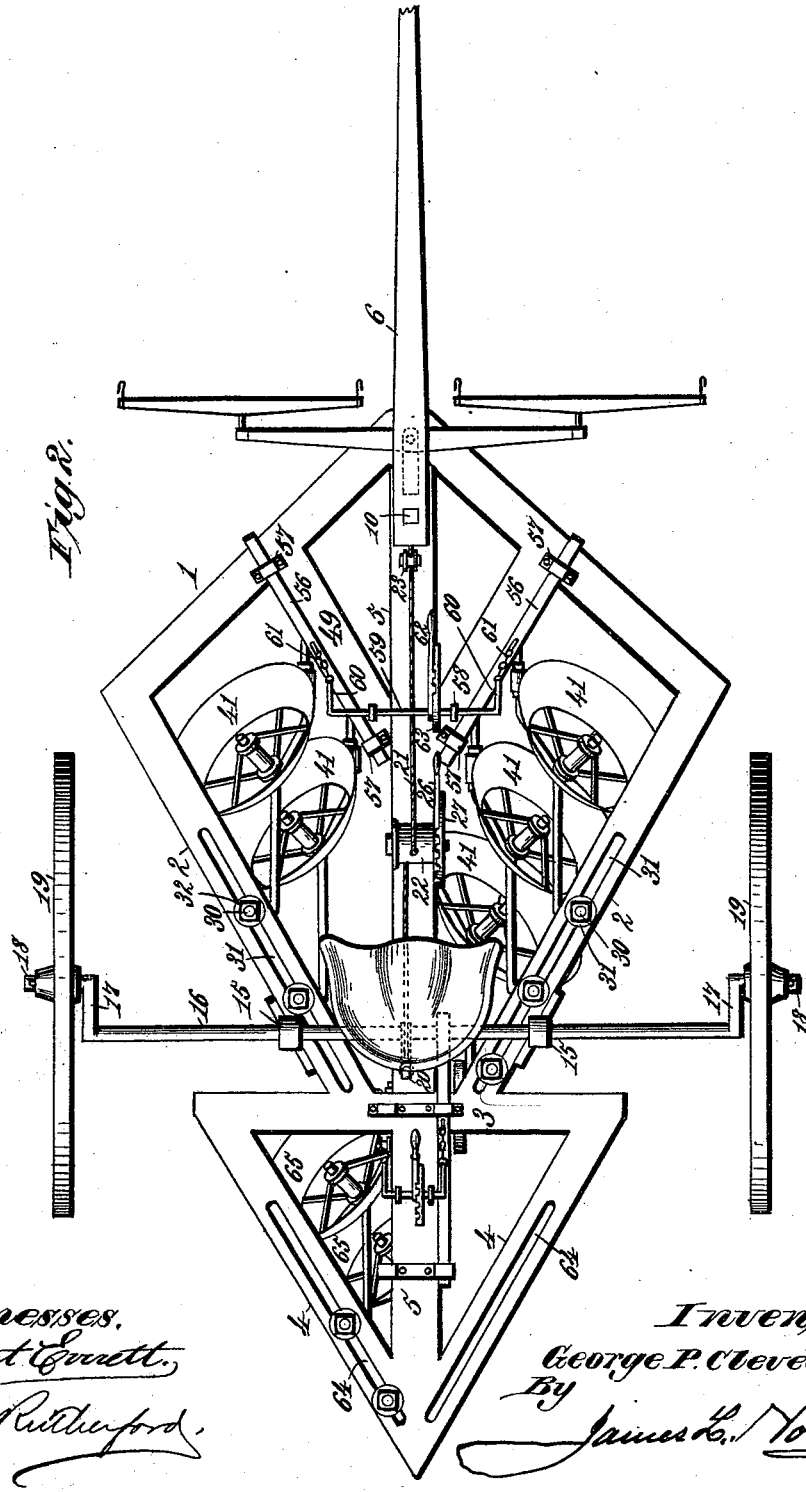

UNITED STATES PATENT OFFICE.

GEORGE P. CLEVELAND, OF COLEMAN, TEXAS.

GANG-PLOW.

SPECIFICATION forming part of Letters Patent No. 455,171, dated June 30, 1891.

Application filed January 24, 1891. Serial No. 379,185. (No model.)

*To all whom it may concern:*

Be it known that I, GEORGE P. CLEVELAND, a citizen of the United States, residing at Coleman, in the county of Coleman and State of Texas, have invented new and useful Improvements in Gang-Plows, of which the following is a specification.

My invention relates to that type of agricultural machines by which the soil is cut, broken, or pulverized, and turned by one or more rotary cupped disks or gangs of the same, said machines being usually termed "rotary gang-plows" or "disk harrows."

It is the purpose of my invention to provide a plow having some of the characteristics of this type, but in which the "disks," as they are usually termed, each consisting of a flared annulus, such as would be formed by the truncation of a conical shell of large base and small altitude, are so mounted that they will penetrate the soil to the desired depth by their own natural draft with the minimum degree of friction and outlay of force.

It is also my purpose to simplify and improve both the construction and operation of this kind of plow, to lighten its weight, to give to the disk or annular blade a broader or more extended base of support, whereby it shall be braced in all directions in which material strain is applied, to provide novel means whereby the disks or plows may be raised and lowered, either to vary the depth of draft or to arrest the operation of the plows entirely during transportation, and to combine with the frame simple devices whereby it may be raised at any moment and all the plows withdrawn from the soil without interfering with or obstructing the transportation of the plow upon its wheels.

It is my further purpose to provide a gang-plow of this type with disks so constructed and mounted that they are enabled to cut and turn the soil with less labor and with less wear and tear of the mechanism than has heretofore been feasible, the journal-support for each plow being independently movable and having adjustable means of support to gage the cut to a uniform depth, and to provide means whereby the soil in the central space between two converging gangs or series of disks may be plowed by an independent disk or disks changeable from side to side, means being provided for compensating the side draft produced by the latter.

The invention consists in the new features of construction and novel combinations of parts hereinafter fully set forth, and then more particularly pointed out and defined in the claims following this specification.

To enable others skilled in the art to make, construct, and use my said invention, I will proceed to describe the same in detail, reference being had to the accompanying drawings, in which—

Figure 1 is a side elevation of a rotary disk-plow embodying my invention. Fig. 2 is a plan view of the same. Fig. 3 is a detail perspective view of one of the rotary disks, or, as I prefer to term it, "staggered-spoke wheel-plows," its supports, gage wheel or runner, and brace, the parts being removed from the frame and shown upon an enlarged scale in their working position. Fig. 4 is an elevation of the same parts, taken from the rear side or face of the disk. Fig. 5 is a plan view of said parts.

In the said drawings the reference-numeral 1 indicates the supporting-frame of the plow, which may be formed of wood or metal. This frame I usually construct of two forwardly-converging beams, the ends of which meet in or about the central fore-and-aft line, where they are connected to the tongue, and two somewhat longer rearwardly-converging beams 2, which are jointed at their rear extremities to a transverse beam 3, forming part of a triangular frame, the two remaining beams 4 meeting at their apex a beam or brace 5, passing centrally between the beams 2 and uniting with the apex of the forwardly-converging beams of the frame. The shape of this frame may be considerably varied without departing from my invention; but I prefer that shown upon some accounts, as it is simple in construction, of light weight, and not expensive. The tongue 6 is connected to the frame by means of a steering-wheel 7, journaled between the arms of a fork 8, the latter having a vertical standard or bar 9, which passes through an opening in the central longitudinal beam or brace 5 and rises above the same, its upper end having a square tenon 10 entering a mortise in the rear end of the tongue. To the lower face of the central beam 5 are bolted braces 12, which support a collar 13, surrounding the vertical bar or standard 9 a little distance below the beam, thus giving support to said standard at two separate points. The collar 13 may rest upon a shoulder 14, formed by the upper end of the frame 8; but this end of the frame is preferably suspended or sustained by means which will be described hereinafter.

At or near the rearward ends of the beams 2 are mounted brackets 15, parts of which rise above the frame and receive an axle 16, passing across the beams 2 a little above the same. The axle is extended laterally to enable its wheels to clear the frame, and at or near its ends it is provided with arms 17, standing at right angles to the axle, with which they unite. Upon the ends of these arms are formed the journals or bearings 18, which enter the axle-boxes in the wheel-hubs. The wheels 19 are of any suitable construction and size, the diameter thereof being such as to sustain the frame at the required height when the arms 17 at or near the ends of the axle lie horizontal, or nearly so.

At or near the middle portion of the axle 16 is rigidly mounted a strong lever-arm 20, which extends in a rearward direction with an upward inclination, said arm being mounted on the side of the axle opposite the arms 17. This lever-arm may be conveniently arranged beneath the driver's seat, and to its end is connected a chain or wire cable 21, which is carried forward, passed beneath a pulley or drum 22, and coiled or wound one or more times around said drum, from the upper side of which it extends forward and passes beneath a small pulley 23, arranged upon the forward end of the central beam or brace 5. From this latter pulley the wire cable or chain extends upward and its end is fastened to a staple or eye 24 upon the lower face of the tongue at its rear end. The pulley or drum 22 is journaled in lugs 25, mounted on the central longitudinal beam or brace 5. It is rotated by a lever 26, which is held at any point by means of a curved rack 27. The drum and pulley are mounted upon the beam in front of the driver's seat to bring the latter within convenient reach of the driver. By drawing said lever toward the rear the cable or chain is shortened upon both sides of the drum, thereby drawing the lever-arm 20 forward and turning the arms 17 downward, by which the frame is lifted. The cable or chain running under the pulley 23 renders this adjustment uniform at both ends of the frame, the forward end thereof being raised and lowered from the staple or eye 24 on the tongue.

Lying against the lower faces of the beams 2 at suitable intervals are blocks or plates 28, having bearings 29, the plates being supported and rendered adjustable longitudinally by means of bolts 30, passing through apertures in the plates and through slots 31 in the beams, the nuts upon their ends resting upon washers 32 upon the upper surfaces of the beams. In the bearing 29 upon each plate is inserted a journal or pivot bearing 33, having a collar 35 resting against one end of the bearing and receiving in an opening near its other end a cross-pin 36, by which longitudinal play or displacement of the journal is prevented. This journal forms part of a bar 37, which extends in a straight line forward in a plane substantially parallel with the central beam 5, and at the same time inclines downward to a point where it is bent at an obtuse angle into a horizontal or nearly horizontal plane inclining slightly inward or toward the center of the frame. At a short distance from the obtuse angle thus formed the bar is again bent at a second obtuse angle, beyond which its end extends straightforward with a slight inclination upward, as shown in Fig. 4.

At the point where the first bend in the bar 37 is formed a stud-bearing or spindle 38 is mounted, projecting outward and upward, with an inclination toward the front of the plow. Upon this spindle is mounted a box 39, having heads or collars at its ends, from which radiate spokes 40, having a "staggered" arrangement, their ends being attached to the opposite heads or collars alternately. At their outer extremities these spokes are strongly fastened to the inner edge of a cupped annulus 41, corresponding in form to a truncated section of a conical shell having a comparatively large base and small altitude. This annulus is formed of steel, and one is mounted upon the spindle carried by each bar 37, supported on the beams 2. These annuli are in other apparatus termed the "rotary" plow-disks; but, this being a misnomer and failing to describe any of the characteristics of the device, I have preferred to term them "cupped" annular plows or staggered-spoke-wheel-plows. By the peculiar construction of the bars 37 and the arrangement of the spindle-bearings 38 the cupped faces of these annular plows are turned forward, outward, and upward, their outer or cutting edges being tangent to the surface of the soil, while the corresponding point of the inner edge is raised somewhat above it. By the same arrangement, also, the outer or cutting edge of each cupped annulus lies within a plane intersecting the line of draft at an acute horizontal angle, while if a vertical plane is passed through the line of draft it will be intersected by the plane of the said cutting-edge at an acute vertical angle.

Upon the straight forward projecting portion of the bar 37 is adjustably mounted a bracket 42, fastened by a set-bolt 43 and having an upright portion provided with a slot 44. In this slot is inserted a bolt-bearing 45, carrying a ground gage-wheel 46, by which the depth of cut of the plow is limited and adjusted. A little in rear of the bracket 42 is a friction-collar 47, confined between two cuffs 48 and lying behind and a little beneath the outer portion of the cupped annulus at the point the maximum strain is imposed upon it by the resistance of the soil.

Supported between the central beam 5 of the plow and the two forwardly-converging beams are supports 49, from which are dropped braces 50, having at their lower ends vertical channels 51, which receive the forward ends of the bars 37, which are prolonged beyond the points of attachment of the brackets 42. To the upper extremities of the upright slotted portions of these brackets, which are provided with eyes 52 for the purpose, are secured chains 53, which are extended upward and passed over pulleys or grooved rolls 54, journaled in the supports 49, the ends of said chains being attached to slide-plates 56, resting upon said supports and movable longitudinally in keepers 57. Mounted in uprights 58, rising from said supports, is a transverse rock-shaft 59, having at its ends downwardly-extending arms 60, to the extremities of which are connected chains 61, attached to the slide-plates 56. The rock-shaft 59 is turned by a lever 62 in order to retract the slide-plates and raise the forward ends of the bars 37, thereby lifting the whole series of plows in each gang simultaneously. The lever is held by a curved rack-bar 63, and the slide-plates are drawn forward when this lever is unlocked by the weight of the suspended plows.

In the bars 4 of the rearward triangular frame are formed slots 64, and upon one of these bars is mounted a plow 65, corresponding in its construction and means of support and adjustment with the similar parts already described. This plow operates upon the soil between the two rearward plows of the gangs upon the beams 2. In order to equalize the side draft caused by the angle at which the cutting-edges of the plows act upon the soil, and which would preponderate upon that side of the frame on which the plow 65 acts, I remove the rear plow from the gang carried by the beam 2 upon the same side; but as this causes the preponderance of side draft to shift to the other side of the frame, owing to the greater acting distance or leverage of the plows on the latter gang, I attach the removed plow to the beam and immediately in front of the plow 65, as shown in Fig. 2, and thereby obtain an equality of lateral thrust upon both sides.

The operation in a plow thus constructed is substantially as follows: The plow-carrying bars being lowered, as shown in Fig. 2, and the team being started, rotary movement is given to the cupped steel annuli by reason of the fact that its plane of rotation forms an acute horizontal angle with the line of draft. Moreover, as the cutting-edge of each steel annulus is but little lower at the point where it is tangent with the soil than the corresponding point upon the inner edge, the annulus readily enters the earth and is quickly drawn in as deep as the gage-wheel will permit it to enter. The deeper it enters the greater is the force with which it rotates, enabling its edge to cut through turf or sod and raise the soil, which slides up over the inner face of the annulus and, passing over its inner edge, is broken in pieces by the lifting action and further pulverized by the spokes between which it passes, being finally deposited in the unbroken ridge or furrow of the succeeding plow.

The ground gage-wheel permits the plow to follow the inequalities of the ground and sink to a uniform depth at all points. In a country where the surface is much broken by "hog-wallows" or from other causes this is an essential feature of a plow. The gage-wheel may be adjusted upon its bracket to allow the plow to cut to any required depth.

By the construction of the staggered-spoke wheel-plow or annulus I give a very strong support to the edge of the same, as will be seen in Figs. 4 and 5, having such an extended base that a rupture or dangerous strain is very unlikely to occur. By the addition of the supporting friction-roll upon the forward end of the bar, and which supports the outer edge of the annulus, the strength of the plow is rendered equal to any strain that can be imposed.

What I claim as my invention is—

1. In a plow, the combination, with a bar pivotally mounted at one end and extending forward and downward and provided with a spindle, of a cupped annulus having its hub journaled on the spindle, and a ground gage-wheel mounted on the free end of said bar in advance of the annulus, substantially as described.

2. In a plow, the combination, with a bar pivoted at one end to the frame, of a cupped annulus journaled on a spindle on said bar, and a ground gage-wheel adjustable vertically in a movable bracket mounted on the bar in advance of said annulus, substantially as described.

3. In a plow, the combination, with one or more series of bars pivotally mounted at one end upon plates which are adjustable upon the plow-frame, of cupped annuli mounted upon spindles upon said bars, the forward ends of the latter having vertical play in guides carried by the plow-frame, substantially as described.

4. In a plow, the combination, with a series of bars pivotally mounted at one end, of cupped annuli journaled upon spindles carried by said bars, the forward ends of the latter having vertical play in guides depending from the frame, chains connected to said bars and running over pulleys or rolls on the plow-frame, and slide-plates to which said chains are connected.

5. In a plow, the combination, with a frame to which the plow-bars are pivoted at one end, of an axle connected to said frame and having at its ends parallel arms from which the journals project, a guide-wheel having a standard passing upward through an opening in said frame, its upper end having a tenon entering the rear end of the tongue, a drum journaled on the frame between the axle and guide-wheel and having a chain or cable attached to an arm on the axle and winding on the drum, and a chain winding in the same direction on the drum and passing under a pulley on the forward end of the frame, its end connected to the end of the tongue, substantially as described.

6. The combination, with one or more plows, each consisting of a steel annulus having spokes staggered upon its hub and attached to the inner edge of the steel annulus, of bars having spindles upon which said plows are journaled, and blocks or plates upon which the rear ends of said bars are hinged or pivoted, and a slotted frame upon which said plates are adjustable, substantially as described.

7. The combination, with a wheeled plow-frame, of a bar pivoted at its upper extremity to the frame and having a laterally-projecting spindle and a forwardly-projecting extension in advance of the spindle, a cupped annulus journaled upon the spindle, a bracket adjustable on the forward extension of the pivoted bar, and a gage-wheel vertically adjustable on the bracket, traveling in advance of the cupped annulus, and serving to vary the depth of penetration thereof, substantially as described.

8. In a plow, the combination, with a frame, of a series of bars pivoted or hinged at one end to the frame, having outwardly, upwardly, and forwardly projecting spindle-bearings, a series of plows mounted on said spindles, each plow consisting of a cupped annulus of steel, and means for raising and lowering the said frame to vary the angle at which the plows enter the soil, substantially as described.

9. A plow consisting of a cupped steel annulus having an elongated hub on which the spokes are staggered, their other ends being attached to the outer or convex surface of the annulus at its inner edge, a bar hinged or pivoted at its rear end on the plow-frame and having a spindle receiving the said hub, and a supporting friction-wheel mounted on the bar and supporting the outer or convex surface of the annulus at its outer edge, substantially as described.

10. The combination, with a wheeled plow and a vertically-adjustable guide-brace having a vertical channel at its lower end portion, of a bar pivoted at its upper extremity to the plow-frame and having a lateral spindle and a forwardly-projecting extension in advance of the spindle, which engages the channeled part of the guide-brace, a plow annulus on the spindle, a bracket adjustable on the forward extension of the pivot-bar, and a gage-wheel vertically adjustable on the bracket and interposed between the plow-annulus and the channeled guide-brace for the purpose of varying the depth of penetration of the annulus, substantially as described.

In testimony whereof I have hereunto set my hand and affixed my seal in presence of two subscribing witnesses.

GEO. P. CLEVELAND. [L. S.]

Witnesses·
 GEO. W. REA,
 JAMES A. RUTHERFORD.